B. A. CHILSON.
PLOW.
APPLICATION FILED JAN. 15, 1906.
900,981.
Patented Oct. 13, 1908.
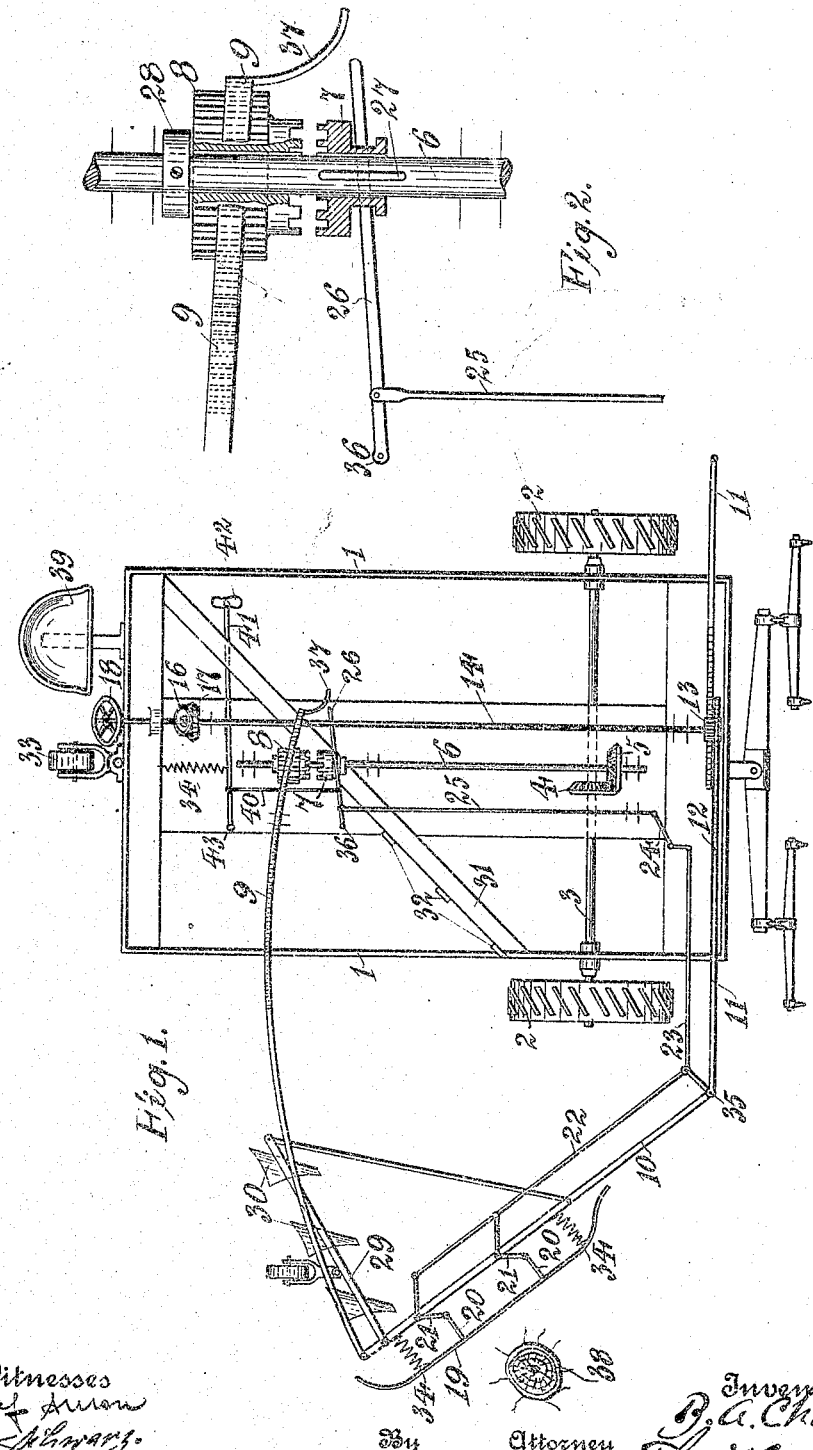
Witnesses
Inventor
B. A. Chilson
By Attorney

UNITED STATES PATENT OFFICE.

BENN A. CHILSON, OF UKIAH, CALIFORNIA.

PLOW.

No. 900,981.  Specification of Letters Patent.  Patented Oct. 13, 1908.

Application filed January 15, 1906. Serial No. 295,996.

*To all whom it may concern:*

Be it known that I, BENN A. CHILSON, a citizen of the United States, and resident of Ukiah, in the county of Mendocino and State of California, have invented certain new and useful Improvements in Plows, of which the following is a specification.

The object of this invention is principally to plow near and around the trunks of orchard trees, where the low hanging limbs prevent the use of the ordinary plow.

In the accompanying drawing, forming part of this specification, Figure 1 is a plan. Fig. 2 is a section of some of the gearing.

Like figures refer to like parts.

The frame 1 of the carriage is carried on driving wheels 2 and swivel wheel 33, on forward end of frame is an arm 11 extending to one side, on the end of this arm is movably attached at 35 another arm member 10, near the end of this member is fixed a quadrant 9 and a brace 29, to this brace is secured one or more plows 30, to the arm member 10 is attached a plate or bar 19 by connections 20 and bell crank levers 21, and held by springs 34 in a normal position. The bell crank levers are connected to rod 22, the rod 22 is connected through rod 23, and bell crank 24, to rod 25 and through a lever 26 operates clutch 7, which is splined slidable on shaft 6 secured to collar 28.

5 is a bevel gear wheel on shaft 6 meshing into bevel wheel 4.

On shaft 3 are the driving wheels 2.

12 is a toothed rack on arm 11 into which meshes pinion 13 on shaft 14.

17 is a wheel on shaft 14 into which gears the wheel 16 connected to hand wheel 18.

37 is a cam shaped projection on quadrant 9.

39 is a seat for the plowman.

41 is a lever which can be operated by foot at 42 through rod 40 to lever 26.

38 represents a tree.

32 shows, places for attaching plows to frame for plowing narrow spaces.

The drawing shows but one arm member 10 and one gang of plows on the right of the carriage, a similar gang is designed to be carried on the left hand side of the carriage and connected to the arm 11, similar to that shown on the right hand side connected to the broken arm 11.

The operation of this machine is as follows—The carriage being drawn forward, the arm 10 extended, the plows approach a tree and through the connection described or its equivalent releases the clutch 7 when the quadrant 9 the arm 10 and the plows 30 swing inward until the bar 19 is past the tree when springs 34, or their equivalent, returns the parts to the normal position and the clutch 7 in gear with 8 forces the quadrant outward to a set limit and the cam piece 37 forces lever 26 to release the clutch. If the plowman should wish to have the plows move inward at any other time, by placing his foot on lever 41, through connection 40 to the clutch lever 26, the same movement will be effected as if operated by the bar 19. The distance that the arm carrying the plows 11 extend beyond the side of the carriage can be set by the plowman using the hand wheel 18 and connecting through bevel gear 16 and 17, shaft 14 to pinion 13, which is in gear with racks on arm 11.

Having described my invention, what I claim and desire to secure by Letters Patent is 1. In a plowing mechanism, a frame, an arm movably connected to the forward part of the frame, a member attached by hinged joint to the arm, a brace attached to the member, plows carried by the brace and means for moving the plows to or from the frame, substantially as shown.

2. In a plowing mechanism, a frame, a hinged member 10 movably attached to the forward part of the frame, plows connected to the hinged members, a plate 19 movably attached to the hinged member, mechanism connecting the plate 19 to the driving mechanism whereby the plows are moved to or from the frame, substantially as shown.

Signed at Brooklyn, in the county of Kings and State of New York, this 10th day of January A. D. 1906.

B. A. CHILSON.

Witnesses:
 E. N. ROBER,
 WILLIAM VAN GEEEWEL.